(12) United States Patent
Cassidy et al.

(10) Patent No.: US 6,372,877 B1
(45) Date of Patent: Apr. 16, 2002

(54) POLY(ARYL ETHER KETONES) BEARING ALKYLATED SIDE CHAINS

(75) Inventors: Patrick E. Cassidy, Austin; John W. Fitch, III, San Marcos; Scott D. Gronewald, Burnet, all of TX (US); Anne K. St. Clair, Poquoson; Diane M. Stoakley, Yorktown, both of VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 09/585,456

(22) Filed: Jun. 1, 2000

Related U.S. Application Data

(60) Provisional application No. 60/136,926, filed on Jun. 1, 1999.

(51) Int. Cl.$^7$ ............ C08G 8/02; C08G 14/00; C08F 283/06
(52) U.S. Cl. ........ 528/125; 528/126; 528/220; 528/397; 528/401; 525/242; 525/326.2; 525/328.6; 525/328.8; 525/328.9; 525/471
(58) Field of Search ................ 528/125, 126, 528/220, 397, 401; 525/242, 326.2, 328.6, 328.8, 328.9, 471

(56) References Cited

U.S. PATENT DOCUMENTS 4,902,769 A * 2/1990 Cassidy et al. ............. 528/125

* cited by examiner

*Primary Examiner*—Duc Truong
(74) *Attorney, Agent, or Firm*—Patrick F. Roughen; Hillary W. Hawkins

(57) ABSTRACT

This invention relates generally to poly(aryl ether ketones) bearing alkylated side chains. It relates particularly to soluble, thermally stable, low dielectric poly(aryl ether ketones) with alkylated side chains and especially to films and coatings thereof. These poly(aryl ether ketones) have the following structural formula:

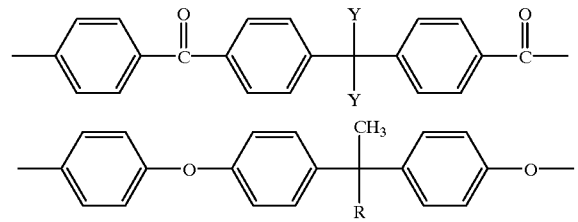

wherein Y is selected from the group consisting of $CF_3$ and $CH_3$; and wherein R is $C_nH_{(2n+1)}$ and n=11–18.

14 Claims, No Drawings

POLY(ARYL ETHER KETONES) BEARING ALKYLATED SIDE CHAINS

CLAIM OF BENEFIT OF PROVISIONAL APPLICATION

Pursuant to 35 U.S.C. §119, the benefit of priority from provisional application No. 60/136,926, with a filing date of Jun. 1, 1999, is claimed for this non-provisional application.

ORIGIN OF THE INVENTION

The invention described herein was jointly made by employees of the United States Government and contractor employees under a cooperative agreement and may be used by or for the Government for governmental purposes without the payment of any royalties thereon or therefor.

FIELD OF THE INVENTION

This invention relates generally to poly(aryl ether ketones) bearing alkylated side chains. It relates particularly to soluble, thermally stable, low dielectric poly(aryl ether ketones) with alkylated side chains and especially to films and coatings thereof.

BACKGROUND OF THE INVENTION

As a class, poly(aryl ether ketones) are thermoplastic matrix resins that exhibit high strength, toughness, good electrical properties, thermooxidative stability and solvent resistance. The insoluble nature of these polymers, however, prevents them from being solution cast into polymer films and necessitates that they be extruded instead. Insolubility is evidenced in Victrex's PEEK®, a commercially available poly(aryl ether ketone).

Fluorinated poly(phenylene ether ketone), 12-F-PEK, films and coatings incorporating hexafluoroisopropylidene have been synthesized that are thermally stable, low dielectric, highly transparent and soluble in common organic solvents thus enabling them to be solution cast or spray coated to produce thin films and coatings (U.S. Pat. No. 4,902,769). These polymers, however, are produced from fluorinate monomers that are expensive and environmentally unfriendly.

The present invention reduces the amount of fluorine added by way of replacing some of the fluorine groups with alkylated side chains. The resulting polymer has the desired properties of thermal stability, low dielectricity and solubility in organic solvents.

Accordingly, it is a primary object of the present invention to provide soluble, thermally stable, low dielectric poly(aryl ether ketones) with alkylated side chains.

It is further an object of the present invention to provide films and coatings thereof.

SUMMARY OF THE INVENTION

According to the present invention the foregoing objects are achieved by the provision of a poly(aryl ether ketone) having the following structural formula:

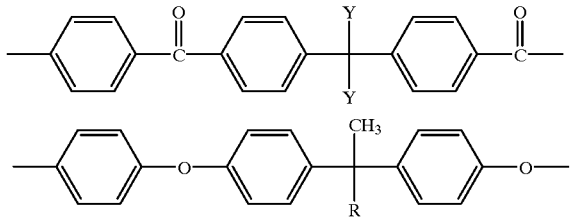

wherein Y is selected from the group consisting of $CF_3$ and $CH_3$; and wherein R is $C_nH_{(2n+1)}$ and n=11–18.

This polymer is prepared by reacting alkylated diphenols of the following structure

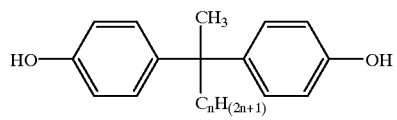

where n=11–18;

with activated bisfluorophenyl monomers of the following structure

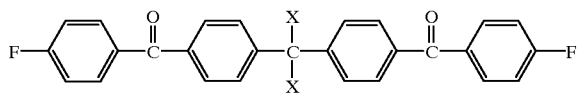

where X is $CF_3$ or $CH_3$.

Random terpolymers were derived from the reaction of 2,2-bis(4-carboxyphenyl)hexafluoropropane (Bis-AF), and an alkylated diphenol, as shown above, with an activated bisfluorophenyl monomer, as shown above.

By the present invention, poly(aryl ether ketones) bearing alkylated side chains are provided which are soluble, thermally stable, low dielectric and can be solution cast or sprayed to produce films and coatings.

DESCRIPTION OF THE PREFERRED EMBODIMENTS

Poly(aryl ether ketones) were prepared according to the route shown below:

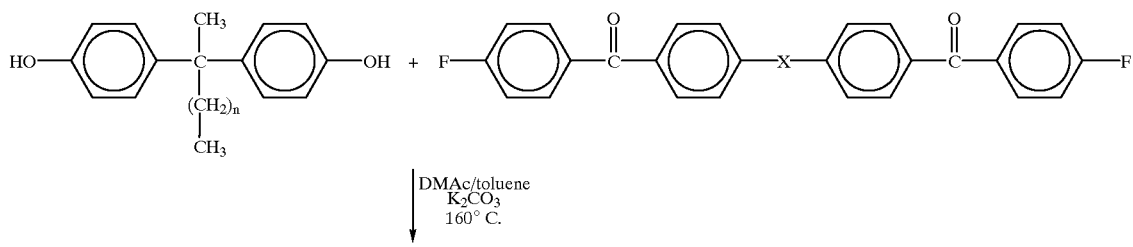

-continued

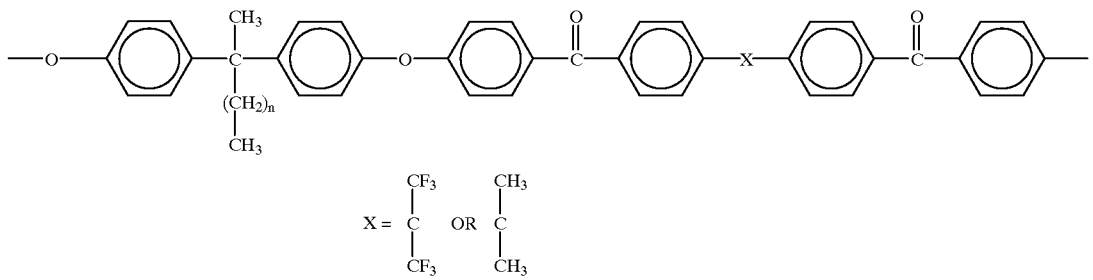

The first step in preparing these poly(aryl ether ketones) involves synthesis of an alkylated diphenol. Any methyl ketone with at least eleven total carbon atoms could be condensed with phenol to yield the desired monomer. Addition of anhydrous hydrogen bromide and a sulfur-containing catalyst, such as mercaptoacetic acid, along with anhydrous hydrogen chloride could be used to produce the desired bisphenol. The modified bisphenol is shown below:

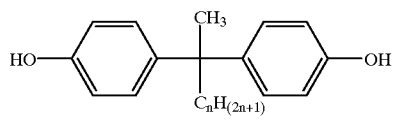

where n=11–18.

The next step is to prepare the activated bisfluorophenyl monomer, as shown below:

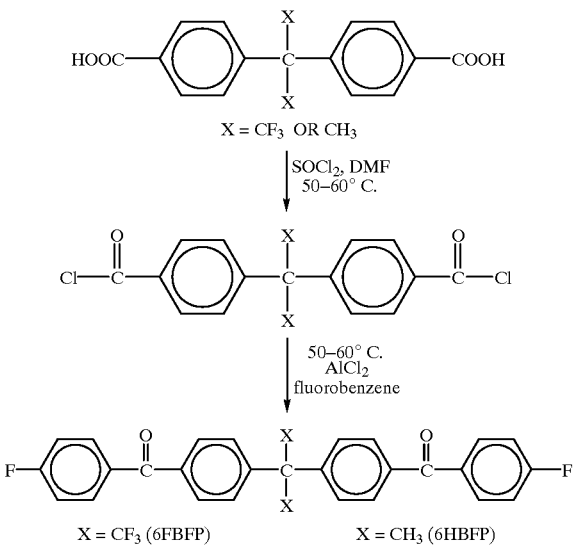

This compound, 6HDCA, and its fluorinated analog, 6FDCA, were reacted with thionyl chloride with DMF as a catalyst to produce the corresponding chloroformylphenyl compounds in good yields.

In the naming of the polymers, the C11 and C17 refer to the length of the carbon chain attached between the ether linkages, and the 6F refers to the hexafluoroisopropylidene group located between the ketone linkages. The polymers designated with an AF in the name indicate a random terpolymer made from Bis-AF and the alkylated bisphenol present in a one to one ratio (i.e. AF:C11(1:1)).

All the PEKs synthesized were soluble in common organic solvents such as chloroform and tetrahydrofuran as well as polar aprotic solvents, such as N,N-dimethylformamide, N,N-dimethylacetamide and dimethyl sulfoxide. The inherent viscosities for the polymer series ranged from 0.56–1.04 dL/g, and all were measured at a concentration of 0.25 g/dL at 25° C. in chloroform. All polymers precipitated as white fibrous materials. Yields for the polymers ranged from 80–93% with the lowest being for AF:C17-PEK. All elemental analyses were within 0.6% of theoretical. Clear, colorless, tough, creasable films were cast from chloroform (15%w/v). These films were use to determine dielectric constants as well as infrared spectra. All the PEKs were subjected to thermogravimetric analysis (TGA) in both air and nitrogen. Thermal stabilities, taken at a 10% weight loss with a heating rate of 20° C./min., ranged from 402° C.–479° C. in air and 450° C.–494° C. in nitrogen. Char yield (%) were determined in nitrogen at 800° C. and ranged from 30–50 percent. All the PEKs were also analyzed by differential scanning calorimetry (DSC) in nitrogen. Glass transition temperatures (Tg) were taken as the midpoint of the step transition during the second heating and ranged from 78° C. for 6FC17 to 143° C. for AF:C11 (1:1).

SPECIFIC EXAMPLES

Example I

Synthesis of 2,2-Bis(4-hydroxyphenyl)tridecane and 2,2-Bis(4-hydroxyphenyl)nonadecane (Bis-C11 and Bis-C17)

In a 100-ml, three-neck, round-bottom flask, equipped with a magnetic stirrer, condenser, rubber stopper with a glass tube and an argon outlet connected to a HCl trap, was placed a mixture of the ketone (5.0000 g (0.0252 mol of 2-tridecanone, 0.0177 mol of 2-nonadecanone)), a ten molar excess of phenol and one milliliter of mercaptoacetic acid. The mixture was then heated to 40° C. to induce melting; then a mixture of HCl:HBr (2:1) gas was bubbled through the solution using argon as a carrier gas. The HCl and HBr gases were produced in a separate flask, equipped with a magnetic stir bar, by dropwise addition of concentrated sulfuric acid onto a mixture of NaCl and KBr, 4 g each. After heating at 40° C. for a period of time, three hours for bis-C17 and 24 hours for bis C-11, the bisphenol precipitated out of solution. The resulting bisphenol was washed with water until the excess phenol had been removed. The bisphenol was collected, dried over $P_2O_5$ for 12 hours and then recrystallized from hexane to a constant melting point, 75–77° C. for bis-C11 and 83.5–85° C. for bis-C17.

Example II

Synthesis of 2,2-Bis[4-(4-fluorobenzoyl)phenyl] hexafluoropropane (6FBFP)

A one-liter, round-bottom flask was charged with 200 grams (0.512 mol) of 2,2-bis(4-carboxyphenyl)

hexafluoropropane, 400 mL of thionyl chloride and five drops of DMF as a reaction catalyst. The reaction mixture was heated at reflux for two hours at which time a clear, yellow solution was formed. Excess thionyl chloride was vacuum-distilled from the reaction mixture. The solid residue was dissolved in 200 mL of dry hexane at reflux. The hot solution was suction-filtered to yield a clear, colorless filtrate that was allowed to cool to complete crystallization. A second recrystallization from dry hexane yielded 210 g (95%) of 2,2-bis(4-chloroformylphenyl)hexafluoropropane (6 FDAC) as clear, colorless crystals, m.p. 96–97° C.

A three-liter, three-neck, round-bottom flask was fitted with a reflux condenser, HCl gas trap and argon purge. To the flask was added 210 g of 2,2-bis(4-chloroformylphenyl) hexafluoropropane and 900 mL of fluorobenzene. To the solution was added 160 g (1.20 mol) of anhydrous aluminum chloride in small portions. The reaction was heated at 50° C. to 60° C. until HCl gas evolution ceased. The solution was allowed to cool, separated into two halves, and each half was poured into 3.5 L of 1M HCl. The organic layers were collected, combined and concentrated to an oily residue. One liter of absolute alcohol was added to the residue with stirring to give a crystalline solid. The solid was collected and recrystallized twice from isopropyl alcohol and then treated with charcoal in chloroform at reflux. The mixture was filtered while hot, and the filtrate was poured into ice-cold hexane (three times the volume of chloroform used) to precipitate the 6FBFP. The solid was collected, dried and treated with charcoal in acetone. The mixture was filtered hot, and the 6FBFP was recrystallized from acetone that was taken to a water cloud point to give approximately 160 g (0.292 mol) of 2,2-Bis[4-(4-fluorobenzoyl)phenyl] hexafluoropropane as white needle crystals with a melting point of 142–143° C.

Example III

Synthesis of 2,2-Bis[4-(4-fluorobenzoyl)phenyl] propane (6HBFP)

A 250-ml, round-bottom flask was purged with argon and filled with 15.8653 g (0.0494 mol) of 2,2-bis-(4-chloroformylphenyl)propane (6HDAC) and 100 mL of fluorobenzene. To this solution was added with stirring 18.5 grams of anhydrous aluminum chloride in small portions over a 5-minute period. A small amount of heat was given off as evidenced by a slight rise in the temperature of the solution. The yellow reaction mixture was heated to 50–60° C. for 1.5 hours. The reaction progress was monitored by observing the HCl gas adsorption in a water trap. The reaction mixture was allowed to cool and then poured slowly into 700 ml of stirred, ice-cold 1M HCl. The lower organic layer was collected and concentrated to a light-red solid under reduced pressure. The solid was digested in 100 mL of ethanol for 12 hours and the resulting white solid was collected by filtration. Recrystallization from isopropyl alcohol yielded 15.8 g(73%) of 2,2-Bis-[4-(4-fluorobenzoyl) phenyl]propane (6HBFP), m.p. 167–168° C.

Example IV

Synthesis of poly(aryl ether ketones): General Procedure

A 100-mL, three-neck, round-bottom flask was equipped with a Dean-Stark trap, a reflux condenser, a mineral oil bubbler, a magnetic stir bar and an argon source. To the flask was added bisphenol, anhydrous potassium carbonate (7.30 mmol), 45 mL of toluene and 15 mL of N,N-dimethylacetamide (DMAc). The atmospheric oxygen was removed under vacuum, and the flask was then purged with argon. This was done three times. After removal of the oxygen, the reaction mixture was heated at reflux to allow filling of the Dean-Stark trap to overflow in order to observe water from the reaction azeotroping into the trap with toluene. After three hours the Dean-Stark trap was drained, and excess toluene was allowed to distill over. The reaction flask was allowed to cool to 90° C. and then the activated bisfluoro monomer was added in crystalline form. The sides of the reaction flask were rinsed with solution from the flask. The polymerization was continued at reflux for 16 hours and then the heat source was removed. Upon cooling, the polymer solution was diluted with 30 mL of DMAc and filtered through a coarse-fritted-glass funnel to remove reaction salts. The clear polymer solution was precipitated by pouring the polymer solution slowly down the side of a beaker into 500 mL of stirred water. The precipitate was collected, washed with methanol and dried in vacuo at 50° C. for 12 hours. Each of the polymerizations described in Examples 5–9 followed this general procedure with specific amounts of reactants, yields and analytical results noted.

Example V

6FC11-Poly(aryl ether ketone): Polymerization of 2,2-Bis(4-hydroxyphenyl)tridecane (Bis-C11) and 6FBFP 1.3440 g (3.647 mmol) of Bis-C11 and 2.0000 g (3.647 mmol) of 6FBFP;

Yield: 2.5944 g (81%);

Inherent viscosity: 1.04 dL/g in chloroform;

$T_g$: 109° C.

TGA: 478° C. in air; 492° C. in $N_2$

Char Yield at 800° C.: 50%

Dielectric constant: 2.46

Example VI

AF-C11(1:1)-Poly(aryl ether ketone): Polymerization of 2,2-Bis-(4-hydroxyphenyl) hexafluoropropane (Bis-AF), Bis-C11 and 6FBFP 0.3360 g (0.911 mmol) of Bis-C11, 0.3065 g (0.911 mmol) of Bis-AF and 1.0000 g (1.823 mmol) of 6FBFP;

Yield 2.0196 g (90%);

Inherent viscosity: 0.89 dL/g in chloroform;

$T_g$: 143° C.

TGA: 479° C. in air; 494° C. in $N_2$

Char Yield at 800° C.: 50%

Dielectric constant: 2.47

Example VII

6FC17-Poly(aryl ether ketone): Polymerization of 2,2-Bis(4-hydroxyphenyl)nonadecane (Bis-C17) and 6FBFP 0.8256 g (1.823 mmol) of Bis-C17 and 1.0000 g (1.823 mmol) of 6FBFP;

Yield: 1.49 g (85%);

Inherent viscosity: 0.87 dL/g in chloroform $T_g$: 78° C.

TGA: 402° C. in air; 450° C. in $N_2$

Char Yield at 800° C.: 30%

Example VIII

AF-C17 (1:1)-Poly(aryl ether ketone): Polymerization of 2,2-Bis-(4-hydroxyphenyl) hexafluoropropane (Bis-AF), Bis-C17 and 6FBFP 0.4125 g (0.911 mmol) of Bis-C17, 0.3063 g (0.911 mmol) of Bis-AF and 1.0000 g (1.823 mmol) of 6FBFP;

Yield 1.9651 g (83%);
Inherent viscosity: 0.94 dL/g in chloroform;
$T_g$: 117° C.
TGA: 470° C. in air; 483° C. in $N_2$
Char Yield at 800° C.: 40%
Dielectric constant: 2.39

Example IX

6HC11-Poly(aryl ether ketone): Polymerization of 2,2-Bis(4-hydroxyphenyl)tridecane (Bis-C11) and 6HBFP 1.6734 g (4.5404 mmol) of Bis-C11 and 2.0000 g (4.5404 mmol) of 6HBFP;
Yield: 2.421 g (70%);
Inherent viscosity: 0.91 dL/g in chloroform
$T_g$: 100° C.
TGA: 476° C. in air; 491° C. in $N_2$
Char Yield at 800° C.: 30%

The foregoing examples are given to illustrate the principle of the invention and are not intended to serve as limitations thereof. There are many variations and modifications of the invention that will be readily apparent to those skilled in the art in light of the above teachings. It is therefore understood that, within the scope of the pending claims, the invention may be practiced other than as specifically described herein.

What is claimed is:

1. A poly(aryl ether ketone) having a structural formula of

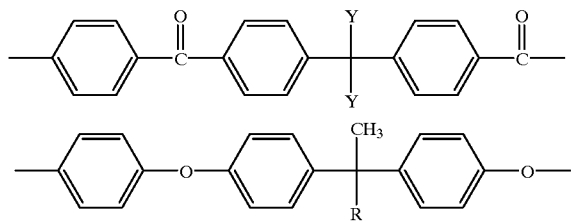

wherein Y is selected from the group consisting of $CF_3$ and $CH_3$; and wherein R is selected from the group consisting of $C_{11}H_{23}$, $C_{12}H_{25}$, $C_{13}H_{27}$, $C_{14}H_{29}$, $C_{15}H_{31}$, $C_{16}H_{33}$, $C_{17}H_{35}$, and $C_{18}H_{37}$.

2. A poly(aryl ether ketone) formed by the reaction in solvent of a diphenol having the general structure:

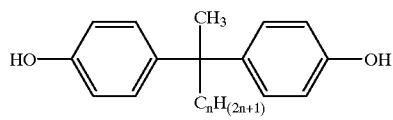

wherein n is selected from the group consisting of 11, 12, 13, 14, 15, 16, 17 and 18 with a bisfluorophenyl having the general structure:

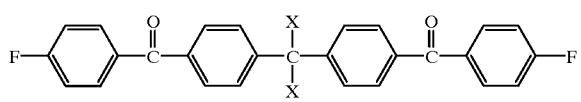

wherein X is selected from the group consisting of $CF_3$ and $CH_3$.

3. The poly(aryl ether ketone) of claim 1 wherein Y is $CF_3$ and R is $C_{11}H_{23}$.

4. The poly(aryl ether ketone) of claim 1 wherein Y is $CF_3$ and R is $C_{17}H_{35}$.

5. The poly(aryl ether ketone) of claim 1 wherein Y is $CH_3$ and R is $C_{11}H_{23}$.

6. A film formed from the poly(aryl ether ketone) of claim 1.

7. A coating formed from the poly(aryl ether ketone) of claim 1.

8. A random terpolymer, poly(aryl ether ketone) having a structural formula of:

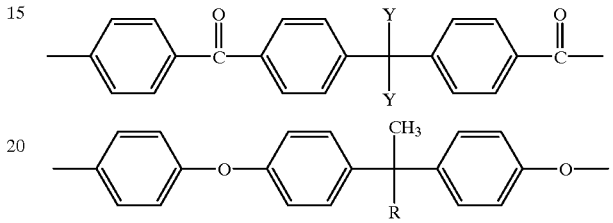

wherein Y is selected from the group consisting of $CF_3$ and $CH_3$ and R is a mixture of $CH_3$ and any member selected from the group consisting of $C_{11}H_{23}$, $C_{12}H_{25}$, $C_{13}H_{27}$, $C_{14}H_{29}$, $C_{15}H_{31}$, $C_{16}H_{33}$, $C_{17}H_{35}$, and $C_{18}H_{37}$.

9. A random terpolymer poly(aryl ether ketone) formed by the reaction in solvent of 2,2-bis(4-carboxyphenyl) hexafluoropropane (Bis-AF), and a diphenol having the general structure:

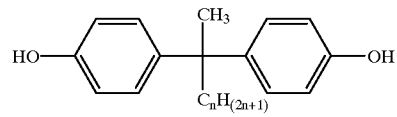

wherein n is selected from the group consisting of 11, 12, 13, 14, 15, 16, 17 and 18 with a bisfluorophenyl having the general structure:

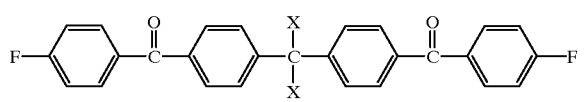

wherein X is selected from the group consisting of $CF_3$ and $CH_3$.

10. A random terpolymer of claim 9 wherein X is $CF_3$ and n is 17.

11. A random terpolymer of claim 9 wherein X is $CF_3$ and n is 11.

12. A random terpolymer of claim 9 wherein Bis-AF and said dipenol have a molar ratio of one to one.

13. A film formed from the poly(aryl ether ketone) of claim 8.

14. A coating formed from the poly(aryl ether ketone) of claim 8.

* * * * *